(12) United States Patent
Connell et al.

(10) Patent No.: US 10,703,173 B2
(45) Date of Patent: *Jul. 7, 2020

(54) MULTI-COMPRESSOR CLIMATE SYSTEM

(71) Applicant: Bergstrom, Inc., Rockford, IL (US)

(72) Inventors: Brett S. Connell, Winnebago, IL (US); Brett Herrmann, Rochelle, IL (US); Aaron D. Sullivan, Winnebago, IL (US); Terry Zeigler, Byron, IL (US)

(73) Assignee: BERGSTROM, INC., Rockford, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/133,599

(22) Filed: Sep. 17, 2018

(65) Prior Publication Data

US 2019/0009648 A1    Jan. 10, 2019

Related U.S. Application Data

(63) Continuation of application No. 15/280,876, filed on Sep. 29, 2016, now Pat. No. 10,081,226.

(Continued)

(51) Int. Cl.
*B60H 1/32* (2006.01)
*F25B 31/00* (2006.01)
(Continued)

(52) U.S. Cl.
CPC ....... *B60H 1/3214* (2013.01); *B60H 1/00849* (2013.01); *B60H 1/00864* (2013.01);
(Continued)

(58) Field of Classification Search
CPC .. B60H 1/3214; B60H 1/323; B60H 1/00849; B60H 1/00864; B60H 1/3223;
(Continued)

(56) References Cited

U.S. PATENT DOCUMENTS

| | | | |
|---|---|---|---|
| 2,722,050 A | 11/1955 | Shank | |
| 2,789,234 A | 6/1956 | Lambert et al. | |

(Continued)

FOREIGN PATENT DOCUMENTS

| | | |
|---|---|---|
| CN | 1468409 A | 1/2004 |
| CN | 2883071 Y | 3/2007 |

(Continued)

OTHER PUBLICATIONS

Alfa Laval Website http://www.alfalaval.com/ecore-Java/WebObjects/ecoreJava.woa/wa/shoNode?siteNodelID=1668&cont . . . ; date last visited May 18, 2007; 1 page.

(Continued)

*Primary Examiner* — Emmanuel E Duke
(74) *Attorney, Agent, or Firm* — Morgan, Lewis & Bockius LLP

(57) ABSTRACT

Disclosed are climate systems and methods for control the climate systems. A climate system includes a plurality of compressors, a first heat exchanger disposed downstream of the compressors and a second heat exchanger disposed downstream of the first heat exchanger. The compressors and heat exchangers are fluidly connected by refrigerant lines to form a refrigerant circuit. The climate system also includes a controller that controls the operation of the compressors to draw back lubricant to the compressors without use of an oil equalization system.

20 Claims, 6 Drawing Sheets

Related U.S. Application Data

(60) Provisional application No. 62/378,135, filed on Aug. 22, 2016.

(51) Int. Cl.
*F25B 49/02* (2006.01)
*B60H 1/00* (2006.01)

(52) U.S. Cl.
CPC ........... *B60H 1/323* (2013.01); *B60H 1/3223* (2013.01); *F25B 31/004* (2013.01); *F25B 49/022* (2013.01); *F25B 49/027* (2013.01); *B60H 2001/3238* (2013.01); *B60H 2001/3255* (2013.01); *B60H 2001/3272* (2013.01); *F25B 2400/075* (2013.01); *F25B 2600/01* (2013.01); *F25B 2600/0251* (2013.01); *F25B 2600/0253* (2013.01); *F25B 2600/111* (2013.01); *F25B 2700/2104* (2013.01); *F25B 2700/2106* (2013.01)

(58) Field of Classification Search
CPC .... B60H 2001/3238; B60H 2001/3255; B60H 2001/3272; B60H 1/3205; F25B 31/004; F25B 49/022; F25B 49/027; F25B 2400/075; F25B 2600/01; F25B 2600/0251; F25B 2600/0253; F25B 2600/111; F25B 2700/2104; F25B 2700/2106
See application file for complete search history.

(56) References Cited

U.S. PATENT DOCUMENTS

| | | | |
|---|---|---|---|
| 3,176,502 A | 4/1965 | Cizek et al. |
| 3,225,819 A | 12/1965 | Stevens |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno |
| 5,230,719 A | 7/1993 | Berner et al. |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A * | 12/1999 | Kurachi ............. F04B 39/0207 62/192 |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,318,103 B1 | 11/2001 | Rieger |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |

(56) References Cited

U.S. PATENT DOCUMENTS

| | | |
|---|---|---|
| 6,467,279 B1 | 10/2002 | Backman et al. |
| 6,474,081 B1 | 11/2002 | Feuerecker |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier |
| 9,783,024 B2 | 10/2017 | Connell et al. |
| 9,878,591 B2 | 1/2018 | Taniguchi et al. |
| 2001/0010261 A1 | 8/2001 | Oomura et al. |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 | 12/2004 | Ikura |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0218530 A1 | 9/2010 | Melbostad et al. |
| 2010/0263395 A1 | 10/2010 | Adachi et al. |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0091867 A1 | 4/2013 | Campbell et al. |
| 2013/0145781 A1 | 6/2013 | Liu |
| 2013/0167577 A1 | 7/2013 | Street |
| 2013/0181556 A1 | 7/2013 | Li et al. |
| 2013/0319630 A1 | 12/2013 | Yamamoto |
| 2014/0066572 A1 | 3/2014 | Corveleyn |
| 2014/0075973 A1 | 3/2014 | Graaf et al. |
| 2014/0102679 A1 | 4/2014 | Matsudaira et al. |
| 2014/0241926 A1* | 8/2014 | Fraser ............... F04C 29/021 418/1 |
| 2014/0260358 A1 | 9/2014 | Leete et al. |
| 2014/0290299 A1 | 10/2014 | Nakaya |
| 2015/0158368 A1 | 6/2015 | Herr-Rathke et al. |
| 2015/0210287 A1 | 7/2015 | Penilla et al. |
| 2015/0236525 A1 | 8/2015 | Aridome |
| 2015/0239365 A1 | 8/2015 | Hyde et al. |
| 2015/0306937 A1 | 10/2015 | Kitamura et al. |
| 2016/0089958 A1 | 3/2016 | Powell |
| 2016/0144685 A1 | 5/2016 | Ochiai et al. |
| 2016/0146554 A1 | 5/2016 | Bhatia et al. |
| 2016/0229266 A1 | 8/2016 | Maeda et al. |
| 2017/0211855 A1* | 7/2017 | Fraser ............... F04C 28/08 |
| 2017/0350632 A1 | 12/2017 | Hirao |

FOREIGN PATENT DOCUMENTS

| | | |
|---|---|---|
| CN | 201872573 U | 6/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| DE | 4440044 A1 | 5/1996 |
| DE | 197 45 028 A1 | 4/1999 |

(56) References Cited

FOREIGN PATENT DOCUMENTS

| | | |
|---|---|---|
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 5/2011 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/0943 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "NITE Connected Climate Controlled Transport Monitoring/Mobile Internet of Things UI Design/Mobil UI: Progress/Printeres/Internet of Things, User Inter . . . ," Oct. 19, 2016 retrieved from: URL:htps://za.pinterest.com/pin/192810427773981541/, 1 pg.
Bergstrom, Inc. Communication Pursuant to Article 94(3), EP14722438.0, dated Jan. 24, 2018, 5 pgs.
Bergstrom, Inc. Corrected Extended European Search Report, EP16204259.2, dated Nov. 24, 2017, 15 pgs.
Bergstrom, Inc. Extended European Search Report, EP16204254.3, dated Jul. 25, 2017, 8 pgs.
Bergstrom, Inc. Extended European Search Report, EP16204256.8, dated Dec. 1, 2017, 13 pgs.
Bergstrom, Inc. Extended European Search Report, EP16204256.8, dated Jan. 12, 2018, 11 pgs.
Bergstrom, Inc. Extended European Search Report, EP16204259.2, dated Oct. 25, 2017, 15 pgs.
Bergstrom, Inc. Extended European Search Report, EP16204267.5, dated Jul. 11, 2017, 8 pgs.
Bergstrom, Inc. Extended European Search Report, EP18177850.7, dated Nov. 28, 2018. 8 pgs.
Bergstrom, Inc. Partial European Search Report, EP16204256.8, dated Jul. 13, 2017, 14 pgs.
Bergstrom, Inc. Partial European Search Report, EP16204259.2, dated May 30, 2017, 14 pgs.
Bergstrom, Inc., 2nd Office Action, CN201380081940.1, dated Jan. 17, 2018, 13 pgs.
Bergstrom, Inc., 2nd Office Action, CN201480027137.4, dated Jul. 13, 2017, 10 pgs.
Bergstrom, Inc., 3rd Office Action, CN201480027137.4, dated Jan. 17, 2018, 19 pgs.
Bergstrom, Inc., 4th Office Action, CN201480027137.4, dated Jul. 26, 2018, 8 pgs.
Bergstrom, Inc., 1st Office Action, CN201680002224.3, dated Dec. 11, 2018, 5 pgs.
Bergstrom, Inc., Communication Pursuant to Article 94(3), EP14717604.4, dated Jun. 2, 2017, 12 pgs.
Bergstrom, Inc., Communication Pursuant to Article 94(3), EP14717604.4, dated Feb. 4, 2019, 5 pgs.
Bergstrom, Inc., Communication Pursuant to Rules 161(2) and 162 EPC, EP13795064.8, dated Jun. 22, 2016, 2 pgs.
Bergstrom, Inc., Communication Pursuant to Rules 161(2) and 162 EPC, EP14717604.4, dated Oct. 23, 2015, 2 pgs.
Bergstrom, Inc., Communication Pursuant to Rules 161(2) and 162 EPC, EP14722438.0, dated Nov. 2, 2015. 2 pgs.
Bergstrom, Inc., International Preliminary Report on Patentability, PCT/US2013/068331, dated May 10, 2016, 6 pgs.
Bergstrom, Inc., International Preliminary Report on Patentability, PCT/US2014/026683, dated Sep. 15, 2015, 6 pgs.
Bergstrom, Inc., International Preliminary Report on Patentability, PCT/US2014/026687, 7 pgs.
Bergstrom, Inc., International Preliminary Report on Patentability, PCT/US2016/021602, dated Sep. 12, 2017 , 11 pgs.
Bergstrom, Inc., International Preliminary Report on Patentability, PCT/US2016/065812, dated Jun. 12, 2018, 8 pgs.
Bergstrom, Inc., International Search Report and Written Opinion, PCT/US2013/068331, dated Nov. 7, 2014, 9 pgs.
Bergstrom, Inc., International Search Report and Written Opinion, PCT/US2014/026683, dated Jul. 3, 2014 12 pgs.
Bergstrom, Inc., International Search Report and Written Opinion, PCT/US2014/026687, dated Jul. 28, 2014, 12 pgs.
Bergstrom, Inc., International Search Report and Written Opinion, PCT/US2016/021602, dated Nov. 3, 2016, 7 pgs.
Bergstrom, Inc., International Search Report and Written Opinion, PCT/US2016/065812, dated Mar. 22, 2017, 12 pgs.
Bergstrom, Inc., International Search Report and Written Opinion, PCT/US2017/021346, dated Jul. 25, 2017, 11 pgs.
Bergstrom, Inc., International Search Report and Written Opinion, PCT/US2018/044093, dated Oct. 25, 2018, 13 pgs.
Bergstrom, Inc., Office Action, CN201480027117.7, 8 pgs.
Bergstrom, Inc., Office Action, CN201480027137.4, 15 pgs.
Bergstrom, Inc., Patent Certificate, CN201480027117.7, dated Nov. 21, 2017, 3 pgs.
Connell, Final Office Action, U.S. Appl. No. 14/209,877, dated Jun. 22, 2016, 17 pgs.
Connell, Final Office Action, U.S. Appl. No. 14/209,877, dated Dec. 29, 2016, 21 pgs.
Connell, Final Office Action, U.S. Appl. No. 14/209,961, dated Jul. 25, 2016, 15 pgs.
Connell, Final Office Action, U.S. Appl. No. 15/064,552, dated Jun. 1, 2017, 9 pgs.
Connell, Final Office Action, U.S. Appl. No. 15/065,745, dated Dec. 17, 2018, 27 pgs.
Connell, Notice of Allowance, U.S. Appl. No. 14/209,877, dated Aug. 4, 2017, 7 pgs.
Connell, Notice of Allowance, U.S. Appl. No. 14/209,877, dated May 16, 2017, 5 pgs.
Connell, Notice of Allowance, U.S. Appl. No. 14/209,961, dated Jun. 15, 2017, 10 pgs.
Connell, Notice of Allowance, U.S. Appl. No. 14/965,142, dated Feb. 26, 2018, 8 pgs.
Connell, Notice of Allowance, U.S. Appl. No. 14/995,119, dated Aug. 31, 2017, 7 pgs.

(56) References Cited

OTHER PUBLICATIONS

Connell, Notice of Allowance, U.S. Appl. No. 15/280,876, dated Jun. 21, 2018, 8 pgs.
Connell, Notice of Allowance, U.S. Appl. No. 15/791,243, dated Jan. 24, 2019, 7 pgs.
Connell, Office Action, dated Oct. 19, 2018, U.S. Appl. No. 15/722,860, 7 pgs.
Connell, Office Action, U.S. Appl. No. 15/283,150, dated Sep. 27, 2018, 21pgs.
Connell, Notice of Allowance, U.S. Appl. No. 15/283,150, dated Mar. 22, 2019, 8 pgs.
Connell, Office Action, U.S. Appl. No. 14/209,877, dated Nov. 27, 2015, 19 pgs.
Connell, Office Action, U.S. Appl. No. 14/209,961, dated Dec. 2, 2015, 14 pgs.
Connell, Office Action, U.S. Appl. No. 14/965,142, dated Aug. 29, 2017, 12 pgs.
Connell, Office Action, U.S. Appl. No. 15/065,745, dated May 31, 2018, 44 pgs.
Connell, Office Action, U.S. Appl. No. 15/280,876, dated Dec. 14, 2017, 23 pgs.
Connell, Office Action, U.S. Appl. No. 15/791,243, dated May 8, 2018, 12 pgs.
FlatPlate Heat Exchangers; GEA FlatPiate Inc.; website—http://www.flatplate.com/profile.html; date last visited Aug. 9, 2007; 3 pages.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Glacier Bay Inc., Company History, pages printed from a website, http://web.archive.org/web/20000301153828/www.g!acierbay.corn/History:.htrn, apparent archive date: Mar. 1, 2000; 2 pages.
Glacier Bay Inc., Contact, page printed from a website, httQ://web.archive.orq/web/19990508104511/W\'"I!V.qlacierba:t.com/Contact.htm, apparent archive date: May 8, 1999; 1 page.
Glacier Bay Inc., Darpa/Glacier Bay ECS, pages printed from a website, httir//web.archive.org/web/19991104132941/wvvw.glacierbay.com/darQatxt.htm, apparent archive date: Nov. 4, 1999, 2 pages.
Glacier Bay Inc., Glacier Bay ECS DARPA Project—Final Report, pages printed from a website, httn://web.archive.or_gjweb/19991103001512/v•vww,_g.Jacierbay.com/Darnhtm.htm, apparent archive date: Nov. 3, 1999, 9 pages.
Glacier Bay Inc., Glacier Bay ECS DARPA Project—Operational Video, page printed from a website, httQ://web.archive.orq/web/19991022221040/wvvw.qlacierbay.com/DarQvid.htm, apparent archive date Oct. 22, 1999; 1 page.
Glacier Bay Inc., Glacier Bay ECS DARPA Project—Project Photos, pages printed from a website, httg://web.archive.org/web/1999"1103012854/www.glacierbay.com/Dargghotos.htm, apparent archive date: Nov. 3, 1999, 2 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., R & D, pages printed from a website, htt://web.archive.org/web/20000121130306/www.glacierbay.com/R&D.htm, apparent archive date: Jan. 21, 2000, 2 pages.
Hansson, Office Action dated Oct. 5, 2018, U.S. Appl. No. 15/256,109, 14 pgs.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Final Office Action, U.S. Appl. No. 15/034,517, dated Aug. 28, 2018, 9pgs.
Mayo Mayo, Final Office Action, U.S. Appl. No. 15/034,517, dated Nov. 30, 2018, 7 pgs.
Mayo Mayo, Office Action, U.S. Appl. No. 15/034,517, dated Feb. 21, 2018, 22 pgs.
Michael Löhle, Günther Feuerecker and Ulrich Salzer; NON Idling HVAC-modufe tor Long Distance Trucks;SAE TechnicalPaper Series 1999-01-1193; International Congress and Exposition, Detroit, Michigan; Mar. 1-4, 1999; 8 pages.
Packless Industries, the leader in refrigerant to water coaxial heat exchangers, flexible hoses and sucti . . . ; website—http://www.packless.com/profile.htmle: date last visited Aug. 9, 2007; 1 page.
Paper No. 26 in IPR2012-00027, Jun. 11, 2013, 12 pgs. (7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Zeigler, Final Office Action, U.S. Appl. No. 13/661,519, dated Sep. 26, 2014, 23 pgs.
Zeigler, Office Action, U.S. Appl. No. 13/661,519, dated Oct. 28, 2015, 20 pgs.
Zeigler, Notice of Allowance, U.S. Appl. No. 13/661,519, dated Jun. 17, 2016, 8 pgs.
Bergstrom, Inc., International Search Report and Written Opinion, PCT/US2017049859, dated Nov. 12, 2017, 4 pgs.
Bergstrom, Inc., International Preliminary Report on Patentability, PCT/US2017049859, dated Mar. 5, 2019, 6 pgs.
Bergstrom, Inc., International Search Report and Written Opinion PCT/US2017053196, dated Sep. 3, 2018, 17 pgs.
Bergstrom, Inc., International Preliminary Report on Patentability, PCT/US2017053196, dated Apr. 2, 2019, 11 pgs.
Bergstrom, Inc., International Search Report and Written Opinion PCT/US2016/423326, dated Sep. 27, 2016, 8 pgs.
Bergstrom, Inc., International Preliminary Report on Patentability PCT/US2016/423326, dated Jan. 16, 2018, 7 pgs.
Bergstrom, Inc., International Search Report and Written Opinion PCT/US2016/42307, dated Oct. 7, 2016, 8 pgs.
Bergstrom, Inc., International Preliminary Report on Patentability PCT/US2016/42307, dated Jan. 16, 2018, 7 pgs.
Bergstrom, Inc., International Search Report and Written Opinion PCT/US2016/42314, dated Sep. 30, 2016, 7 pgs.
Bergstrom, Inc., International Preliminary Report on Patentability, PCT/US2016/42314, dated Jan. 16, 2018, 6 pgs.
Bergstrom, Inc., International Search Report and Written Opinion PCT/US2016/42329, dated Sep. 30, 2016, 6 pgs.
Bergstrom, Inc., International Preliminary Report on Patentability PCT/US2016/42329, dated Jan. 16, 2018, 5 pgs.
Bergstrom, Inc., Communicaton Pursuant to Article 94(3), EP16820096.2, dated Aug. 12, 2019, 7 pgs.
Bergstrom, Inc., Communication Pursuant to Rules 161(1) and 162, EP17780954.8, dated May 10, 2019, 3 pgs.
Bergstrom, Inc., Extended European Search Report, EP19166779.9, dated Aug. 30, 2019, 8 pgs.
Bergstrom, Inc., Patent Certificate CN201480027137.4, dated May 31, 2019, 4 pgs.
Bergstrom, Inc., 3rd Office Action, CN201380081940.1, dated Jul. 30, 2018, 7 pgs.
Bergstrom, Inc., Letters Patent, CN201680002224.3, dated Sep. 10, 2019, 2 pgs.
Connell, Notice of Allowance, U.S. Appl. No. 15/065,745, dated Nov. 14, 2019, 9 pgs.
Connell, Notice of Allowance, dated May 20, 2019, U.S. Appl. No. 15/722,860, 5 pgs.
Connell, Notice of Allowance, dated Sep. 26, 2019, U.S. Appl. No. 15/816,993, 8 pgs.

(56) References Cited

OTHER PUBLICATIONS

Connell, Office Action, U.S. Appl. No. 15/439,865, dated Sep. 24, 2019, 6 pgs.
Connell, Office Action, U.S. Appl. No. 15/660,734, dated Oct. 30, 2019, 24 pgs.
Hansson, Notice of Allowance, U.S. Appl. No. 15/256,109, dated Sep. 24, 2019, 9 pgs.
TYCO Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf>.

* cited by examiner

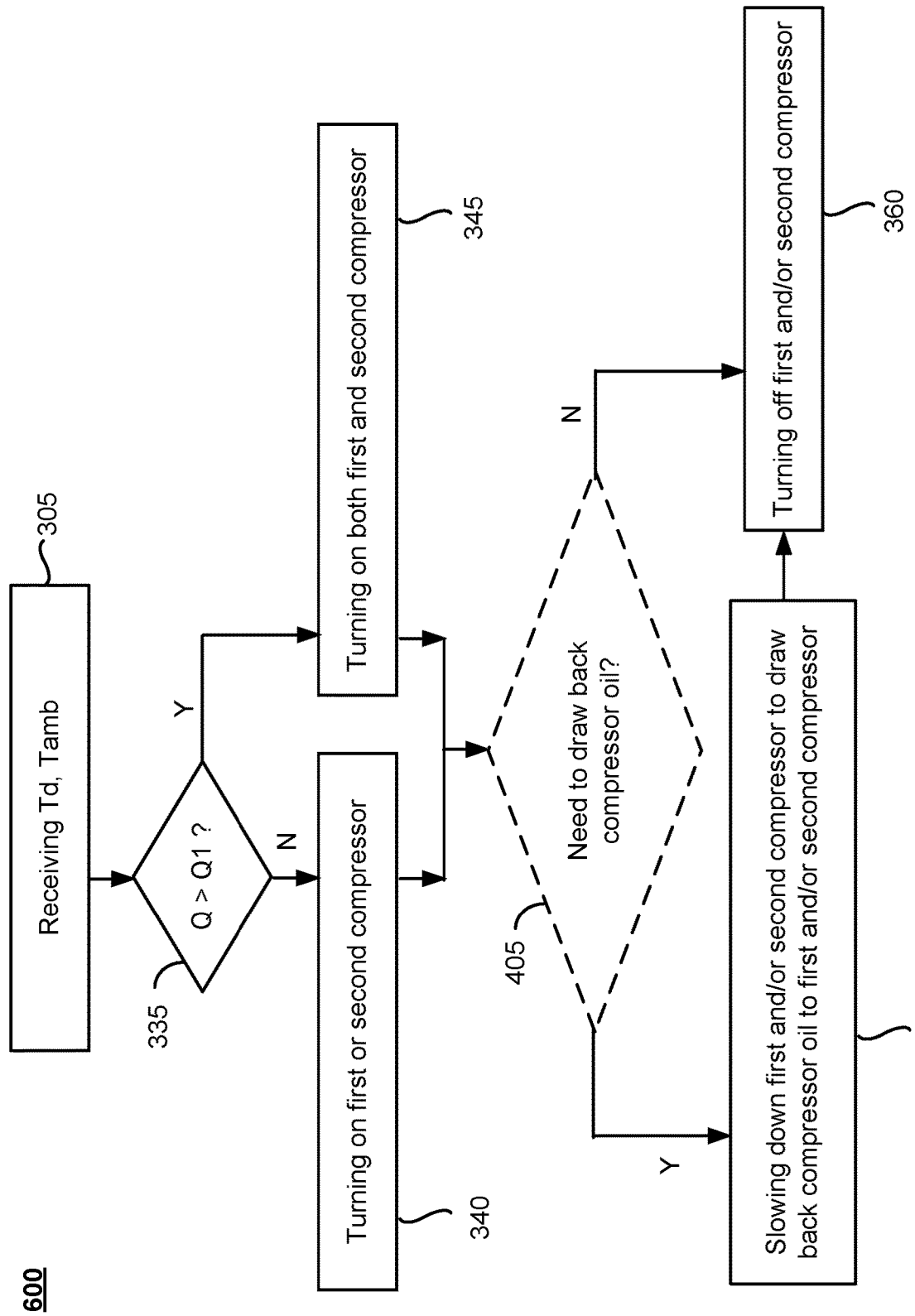

MULTI-COMPRESSOR CLIMATE SYSTEM

RELATED APPLICATIONS

This application is a continuation of U.S. application Ser. No. 15/280,876, filed Sep. 29, 2016, entitled "Parallel Compressors Climate System," which claims priority to U.S. Provisional Application Ser. No. 62/378,135, filed Aug. 22, 2016, entitled "Parallel Compressors Climate System," each of which is incorporated by reference herein in its entirety.

FIELD OF THE INVENTION

The present disclosure generally relates to climate systems and control methods therefor, and more particularly, to vehicle climate systems that use multiple compressors and control methods that can draw-back compressor oil to the compressors without the use of an oil equalization system.

BACKGROUND

It is well known that nearly all compressors require a form of lubricant (e.g., oil) to cool, seal, or lubricate internal components. Typically, only static jet compressors and oil-free machines with rotors suspended in magnetic or air bearings are exempt from the need for some type of lubrication. In refrigeration systems that use compressors, a small portion of the compressor lubricant becomes entrained with the refrigerant and discharged from the compressor. The lubricant entrained in the refrigerant may cause several problems. For example, in a system with a single compressor, if too much lubricant is entrained in the refrigerant, the heat transfer and efficiency of the condenser and evaporator may be significantly reduced. In a system with two or more compressors, in addition to affecting heat transfer and efficiency of the condenser and evaporator, the entrained lubricant may not be returned to both compressors equally or properly, thereby providing too much lubricant to one compressor and too little to the other. This problem is exacerbated when the compressors are arranged in parallel.

Some conventional systems address this by using an oil equalization line system that connects the compressor crankcases or oil sumps via an oil equalization line. This approach usually requires the compressors having the same size and the same capacity and mounted at the same level or height. Other conventional systems use oil separators (either individual or common separators) to separate oil from the refrigerant and then return the separated oil back to the compressors. These systems are inherently complicated, more expensive and/or difficult to maintain and control.

Given the above background, there is a need in the art for climate systems and control methods that are simple, less expansive and/or easy to control and at the same time can realize the benefits of the parallel compressor configuration.

The information disclosed in this Background section is provided solely to provide a general background of the embodiments described herein and is not an acknowledgement or suggestion that this information forms part of the prior art already known to a person skilled in the art.

SUMMARY

Various aspects of the present disclosure provide climate systems and control methods that are simple to make and operate, are less expensive, and easier to control, while at the same time realizing the benefits of a parallel compressor configuration.

In one embodiment, a climate system for cooling a compartment of a vehicle is provided. The climate system includes a plurality of compressors, a condenser, an evaporator, refrigerant lines and a controller. The plurality of compressors is arranged in parallel for compressing refrigerant into a compressed refrigerant. The condenser is disposed downstream of the plurality of compressors for condensing the compressed refrigerant. The evaporator is disposed downstream of the condenser for evaporating the condensed refrigerant. The evaporator is thermally coupled to the compartment of the vehicle to cool the compartment. The refrigerant lines fluidly connect the plurality of compressors, the condenser, and the evaporator to form a refrigerant circuit for circulating the refrigerant. The controller is electrically coupled to the first and second compressors and configured to automatically and independently control operation of the first and second compressors to draw back compressor oil to the first and second compressors.

The plurality of the compressors includes a first compressor and a second compressor. In one embodiment, at least one of the first compressor and the second compressor is a twin rotary vane compressor. In another embodiment, one of the first compressor and the second compressor is a single rotary vane compressor. The first compressor includes a first refrigerant inlet, a first refrigerant outlet, and a first oil sump. The second compressor includes a second refrigerant inlet, a second refrigerant outlet, and a second oil sump. The first refrigerant inlet of the first compressor is fluidly connected to the second refrigerant inlet of the second compressor. The first refrigerant outlet of the first compressor is fluidly connected to the second refrigerant outlet of the second compressor. The first oil sump is independent of the second oil sump. In one embodiment, the first oil sump of the first compressor is independent of the second oil sump of the second compressor in that the first oil sump of the first compressor is not fluidly connected to the second oil sump of the second compressor. In another embodiment, the first oil sump of the first compressor is independent of the second oil sump of the second compressor in that the first oil sump and the second oil sump are not connected by an oil equalizing system.

In some embodiments, the controller automatically controls operations of the plurality of the compressors to draw back compressor oil to the compressors. In an embodiment, the controller operates the first compressor at a first low speed range for a first low-speed time period before turning off the first compressor to allow compressor oil drawn back to the first oil sump. Operating the first compressor at the first low speed range for the first low-speed time period is performed every time when the first compressor is turned off, every other time when the first compressor is to be turned off, or after the first compressor has been operated at a first high speed range for a first high-speed time period. In an embodiment, the controller operates the second compressor at a second low speed range for a second low-speed time period before turning off the second compressor to allow the compressor oil drawn back to the second oil sump. Operating the second compressor at the second low speed range for the second low-speed time period is performed every time when the second compressor is to be turned off, every other time when the second compressor is to be turned off, or after the second compressor is operated at a second high speed range for a second high-speed time period.

In one embodiment, the climate system further includes a sensor for measuring an atmosphere temperature and a thermostat for receiving a desired temperature and detecting an interior temperature in the compartment. The controller is electrically coupled to the sensor and the thermostat and controls operations of the first and second compressors in accordance with the atmospheric temperature, the interior temperature and the desired temperature.

In one embodiment, the climate system further includes a first air blower and/or a second air blower. The first air blower is positioned proximate the condenser, and configured to do one or more of the following: blowing air over the condenser to cool the condenser, and vent interior air of the compartment to reduce the thermal load of the compartment. The second air blower is configured to suck in ambient or fresh air into the compartment of the vehicle, if the interior temperature exceeds both the desired temperature and the atmosphere temperature. The first and second air blowers can be operated simultaneously, alternately or independently. In some embodiments, the climate system is integrated with an existing air conditioning system of the vehicle in that the first air blower and/or the second air blower are shared by the climate system and the existing air conditioning system.

Another embodiment provides a first method for controlling a climate system. The first method includes: (a) receiving a desired temperature for the compartment and an atmosphere temperature outside of the vehicle; (b) monitoring an interior temperature in the compartment of the vehicle; (c) determining whether the interior temperature is higher than the desired temperature; (d) determining whether the interior temperature is higher than the atmosphere temperature; (e) turning on the first air blower to vent interior air in the compartment, if the interior temperature exceeds both the desired temperature and the atmosphere temperature; (f) determining whether the thermal load of the compartment exceeds a first thermal threshold, if the interior temperature is higher than the desired temperature but lower than or equal to the atmosphere temperature; (g) turning on the first compressor or the second compressor if the thermal load of the compartment is less than or equal to a first thermal threshold; and (h) turning on both the first compressor and the second compressor if the thermal load of the compartment exceeds the first thermal threshold.

In some embodiments, the first method further includes one or more additional or optional steps. In one embodiment, the first method includes: operating the first compressor at a first low speed range for a first low-speed time period before turning off the first compressor to allow compressor oil drawn back to the first oil sump; and/or operating the second compressor at a second low speed range for a second low-speed time period before turning off the second compressor to allow the compressor oil drawn back to the second oil sump. In some embodiments, operating the first compressor at the first low speed range for the first low-speed time period is performed every time when the first compressor is turned off, every other time when the first compressor is to be turned off, or after the first compressor has been operated at a first high speed range for a first high-speed time period. Operating the second compressor at the second low speed range for the second low-speed time period is performed every time when the second compressor is to be turned off, every other time when the second compressor is to be turned off, or after the second compressor is operated at a second high speed range for a second high-speed time period.

In some embodiments, the first method includes: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long. Based on the determination, the first method, in some embodiments, operates the first compressor at a first low speed range for a first low-speed time period to draw back compressor oil to the first compressor if the first compressor has been operated at the first high speed range for a first high-speed time period, and/or operates the second compressor at a second low speed range for a second low-speed time period to draw back compressor oil to the second compressor if it is determined that the second compressor has been operated at the second high speed range for a second high-speed time period.

In one embodiment, the first method further includes: turning on a second air blower installed in the vehicle to suck in ambient or fresh air into the compartment of the vehicle, if the interior temperature exceeds both the desired temperature and the atmosphere temperature. In another embodiment, the first method further includes: opening or closing a door in a duct of the existing air conditioning system of the vehicle before turning on the second air blower, wherein the opening or closing of the door allows the second air blower to blow the ambient or fresh air into the compartment of the vehicle.

Yet other embodiments provide a second method for controlling a climate system. The second method includes: (a) receiving a desired temperature for the compartment and an atmosphere temperature outside of the vehicle; (b) determining whether a thermal load of the compartment exceeds a first thermal threshold; (c) turning on the first compressor or the second compressor if the thermal load of the compartment is less than or equal to a first thermal threshold; (d) turning on both the first compressor and the second compressor if the thermal load of the compartment exceeds the first thermal threshold; and (e) performing one or more of the following: operating the first compressor at a first low speed range for a first low-speed time period before turning off the first compressor to allow compressor oil drawn back to the first oil sump; and operating the second compressor at a second low speed range for a second low-speed time period before turning off the second compressor to allow the compressor oil drawn back to the second oil sump.

In some embodiments, prior to operating the first and/or second compressor at a low speed range, the second method further includes one or more of the following additional or optional steps: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long. After the determination, in some embodiments, the second method operates the first compressor at a first low speed range for a first low-speed time period to draw back compressor oil to the first compressor if the first compressor has been operated at the first high speed range for a first high-speed time period; and operates the second compressor at a second low speed range for a second low-speed time period to draw back compressor to the second compressor if it is determined that the second compressor has been operated at the second high speed range for a second high-speed time period.

The systems and methods of the present disclosure have other features and advantages that will be apparent from or are set forth in more detail in the accompanying drawings, which are incorporated herein, and the following Detailed Description.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

FIG. 6 is a flowchart illustrating a second exemplary method for controlling a climate system in accordance with some embodiments.

DETAILED DESCRIPTION

Figure 1:
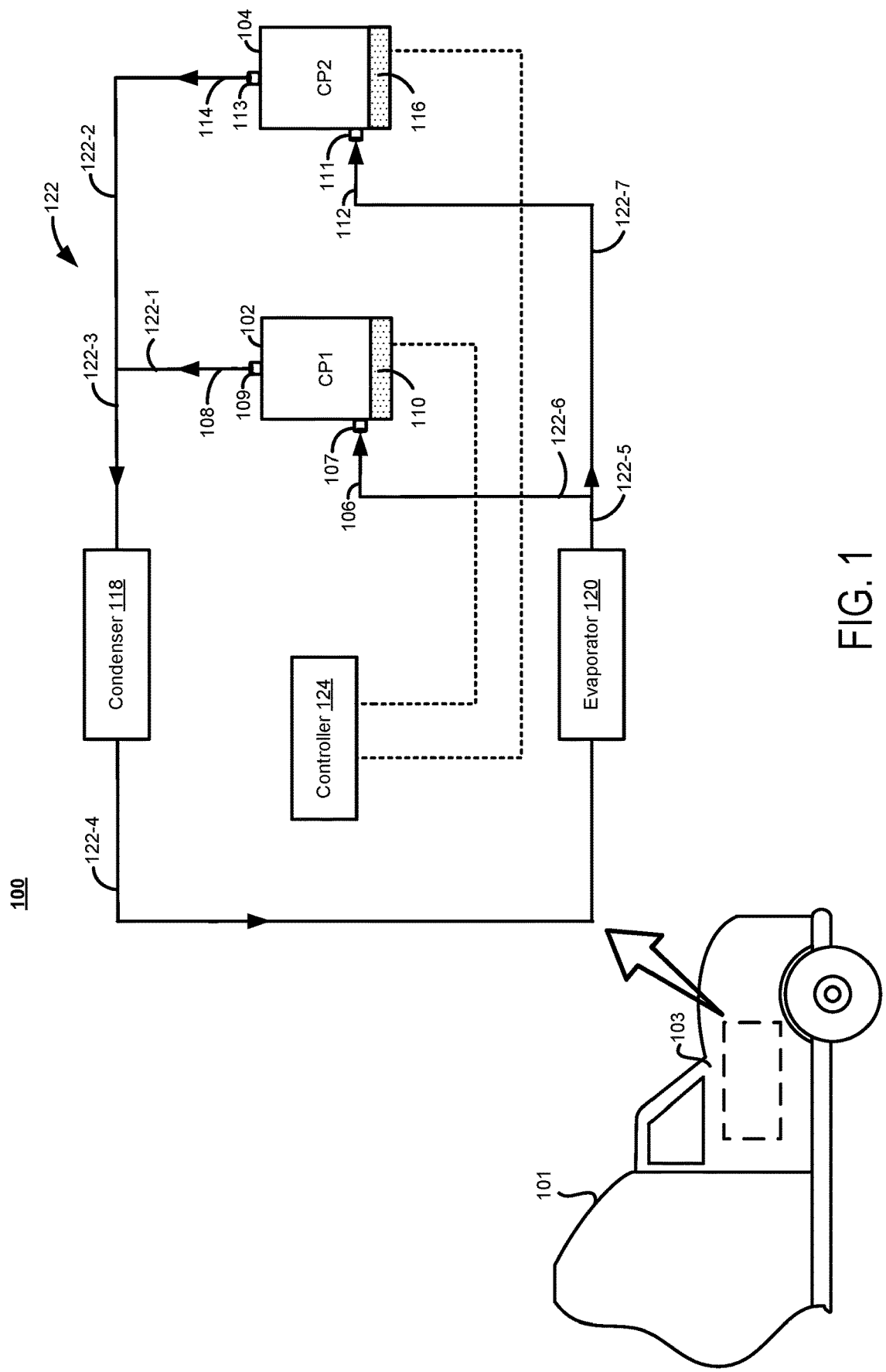
FIG. 1 is a block diagram illustrating a climate system in accordance with some embodiments.

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present disclosure are described in the context of climate systems for use in vehicles and methods for controlling the climate systems. As used herein, a vehicle can be a car, a van, a truck, a bus, a trailer, or other automobiles. A climate system of the present disclosure in general includes two or more compressors that are connected fluidly in parallel but with no oil equalizing system disposed there between. The climate system also includes a condenser (e.g., a first refrigerant-to-air heat exchanger), an evaporator (e.g., a second refrigerant-to-air heat exchanger) and refrigerant lines fluidly connecting the compressors, condenser and evaporators to form a refrigerant circuit. A controller is included in the climate system and a novel method is used to control the compressors to draw back compressor oil that is entrained in the refrigerant or carried away by the refrigerant during operation of the climate system. As used herein, the term "compressor oil" refers to a material (e.g., oil, lubricant, sealant) that is used to cool, seal or lubricate components (e.g., gears) of a compressor. In some embodiments, the compressors are controlled independently based on thermal loads.

With no oil equalizing system, the climate system of the present disclosure is more compact and at the same time more flexible compared to conventional systems. For instance, the climate system can have compressors of different sizes and different capacities, and the compressors do not need to be mounted at the same level, height or elevation. Accordingly, the climate system of the present disclosure can be installed in various ways such as mounted on a rear wall of a sleeper compartment in a vehicle, and/or integrated with other components in the existing air conditioning systems of the vehicle. In addition, by controlling the compressors independently based on thermal loads, the present disclosure improves the system's overall efficiency. In addition, the climate system of the present disclosure requires less parts and thus has a higher reliability and lower cost than climate systems with more parts.

By way of illustration, FIG. 1 depicts a climate system (100) including a plurality of compressors such as a first compressor (102) and a second compressor (104), a condenser (118), an evaporator (120), refrigerant lines and a controller (124). The first compressor (102) includes a first refrigerant inlet (106) and a first refrigerant outlet (108). The second compressor (104) includes a second refrigerant inlet (112) and a second refrigerant outlet (114). The first compressor (102) and the second compressor (104) are fluidly connected to each other in parallel in terms of the refrigerant. For example, in the illustrated embodiment, the first refrigerant inlet (106) of the first compressor (102) is fluidly connected to the second refrigerant inlet (112) of the second compressor (104) by refrigerant lines (e.g., 122-6, 122-7); and the first refrigerant outlet (108) of the first compressor (102) is fluidly connected to the second refrigerant outlet (114) of the second compressor (104) by refrigerant lines (e.g., 122-1, 122-2).

The first compressor (102) further includes a first oil sump (110) and the second compressor (104) includes a second oil sump (116). The first oil sump (110) of the first compressor (102) is independent of the second oil sump (116) of the second compressor (104). As used herein, the term "oil sump" refers to a reservoir that houses lubricant for cooling, sealing, or lubricating internal components such as gears of a compressor. In some cases, the oil sump is a tank, an oil pan, or simply a space at the bottom of a crankcase of a compressor. In some embodiments, independency between the first oil sump (110) and the second oil sump (116) is characterized in that the first oil sump (110) of the first compressor (102) is not fluidly connected to the second oil sump (116) of the second compressor (104). As used herein, the first oil sump "not fluidly connected" to the second oil sump refers to one or more of the following configurations: (i) the first and second oil sumps are not connected by any oil equalizing system (e.g., oil line or oil conduit) that is used in conventional systems to flow oil between different oil sumps and to keep oil in different oil sumps at the same level, (ii) the first and second oil sumps are not connected by a common oil separator that is used in conventional systems to separate the oil from the refrigerant, and (iii) the first and second oil sumps are not connected by a common suction header or conduit that is used in conventional systems to return the oil after being separated from the refrigerant to the oil sumps.

In some embodiments, both the first and second compressors are rotary vane compressors. In one embodiment, at least one of the first compressor (102) and the second compressor (104) is a twin rotary vane compressor. In another embodiment, one of the first compressor (102) and the second compressor (104) is a single rotary vane compressor. It will be appreciated that the first and second compressors are not limited to rotary vane (either single or twin) compressors. Any other suitable compressors including reciprocating, scroll, screw, or centrifugal compressors can be used in the climate system of the present disclosure. In some embodiments, the first refrigerant inlet (106) of the first compressor (102) includes two or more refrigerant intake ports (107), and the first refrigerant outlet (108) of the first compressor (102) includes two or more refrigerant discharge ports (109). Similarly, in some embodiments, the second refrigerant inlet (112) of the second compressor (104) includes two or more refrigerant intake ports (111), and the second refrigerant outlet (114) of the second compressor (104) includes two or more refrigerant discharge ports (113). In some embodiments, the two or more refrigerant intake ports are connected to one another. In some embodiments, the two or more refrigerant outlet ports are connected to one another.

The condenser (118) is disposed downstream of the plurality of compressors and fluidly connected to the plurality of compressors by refrigerant lines (e.g., 122-1, 122-2, 122-3). The evaporator (120) is disposed downstream of the condenser (118) and fluidly connected to the condenser (118) by a refrigerant line (e.g., 122-4). In some embodiments, the evaporator (120) is also fluidly connected to the plurality of compressors by refrigerant lines (e.g., 122-5, 122-6, 122-7), thus forming a refrigerant circuit for circulating the refrigerant.

During operation of the climate system (100), the plurality of compressors compresses a refrigerant into a compressed refrigerant, the condenser (118) condenses the refrigerant that has been compressed by the plurality of compressors, and the evaporator (120) evaporates the refrigerant that has been condensed by the condenser (118). The evaporator (120) is thermally coupled to a compartment (103) of the vehicle (101) to cool the compartment. As used herein, the term "thermally coupled" refers to one or more of the following: (i) the evaporator is mounted within a corresponding compartment (103) to exchange heat with that compartment or with the air in that compartment, and (ii) the evaporator is coupled with a device (e.g., heat exchanger or air blower) which introduces conditioned air into that compartment (103). The compartment (103) can be a cab compartment, a sleeper compartment, a combination of cab and sleeper compartments, or any space in a vehicle.

As shown in FIG. 1, the controller (124) is electrically coupled to the first and second compressors. The controller (124) is configured to automatically and independently control operation of the first and second compressors to draw back compressor oil to the first and second compressors. In some embodiments, to draw compressor oil that is entrained in the refrigerant or carried away by the refrigerant back to the first oil sump (110), the controller (124) operates the first compressor (102) at a first low speed range for a first low-speed time period before turning off the first compressor (102). In one embodiment, operating the first compressor (102) at the first low speed range for the first low-speed time period is performed every time when the first compressor (102) is to be turned off. In another embodiment, operating the first compressor (102) at the first low speed range for the first low-speed time period is performed every other time when the first compressor (102) is to be turned off. In some embodiments, whether to operate the first compressor (102) at a low speed range to draw back compressor oil is determined based on how long the first compressor (102) has been running at a high speed range. For example, in some embodiments, to draw compressor oil back to the first oil sump (110), the controller (124) operates the first compressor (102) at the first low speed range for the first low-speed time period after the first compressor (102) has been operated at a first high speed range for a first high-speed time period.

Similarly, to draw compressor oil that is entrained in the refrigerant or carried away by the refrigerant back to the second oil sump (116), in some embodiments, the controller (124) operates the second compressor (104) at a second low speed range for a second low-speed time period before turning off the second compressor (104). In one embodiment, operating the second compressor (104) at the second low speed range for the second low-speed time period is performed every time when the second compressor (104) is to be turned off. In another embodiment, or operating the second compressor (104) at the second low speed range for the second low-speed time period is performed every other time when the second compressor (104) is to be turned off. In some embodiments, whether to operate the second compressor (104) at a low speed range to draw back compressor oil is determined based on how long the second compressor (104) has been running at a high speed range. For example, in some embodiments, to draw compressor oil back to the second oil sump (116), the controller (124) operates the second compressor (104) at the second low speed range for the second low-speed time period after the second compressor (104) has been operated at a second high speed range for a second high-speed time period.

In some embodiments, the first or second low speed range is between 1500 and 3000 rpm (revolutions per minute), between 1500 and 4500 rpm, or between 1500 and 6500 rpm. In some embodiments, the first or second low-speed time period before turning off the first or second compressor (104) is between 5 and 20 seconds, between 20 and 100 seconds, or between 100 and 200 seconds. In some embodiments, the first or second high speed range is between 1500 and 3000 rpm, between 1500 and 4500 rpm, or between 1500 and 6500 rpm. In some embodiments, the first or second high-speed time period is between 5 and 20 seconds, between 20 and 100 seconds, or between 100 and 200 seconds In some embodiments, the controller (124) is configured to automatically and independently control operation of the first and second compressors based at least partially on a thermal load of the compartment. In some embodiments, the controller (124) turns on the first or the second compressor when the thermal load of the compartment is equal to or less than a first threshold, and turns on both the first and the second compressors when the thermal load of the compartment exceeds the first threshold. In an embodiment, the first and second compressors have the same capacity. In another embodiment, the first and second compressors have different capacities. In some embodiments, the first threshold of the thermal load corresponds to the capacity of the first or the second compressor. In some embodiments, the first threshold of the thermal load is between 0.4 kW (kilowatts) and 0.8 kW, between 0.4 kW and 1.0 kW, or between 0.4 kW and 1.6 kW.

Figure 2:
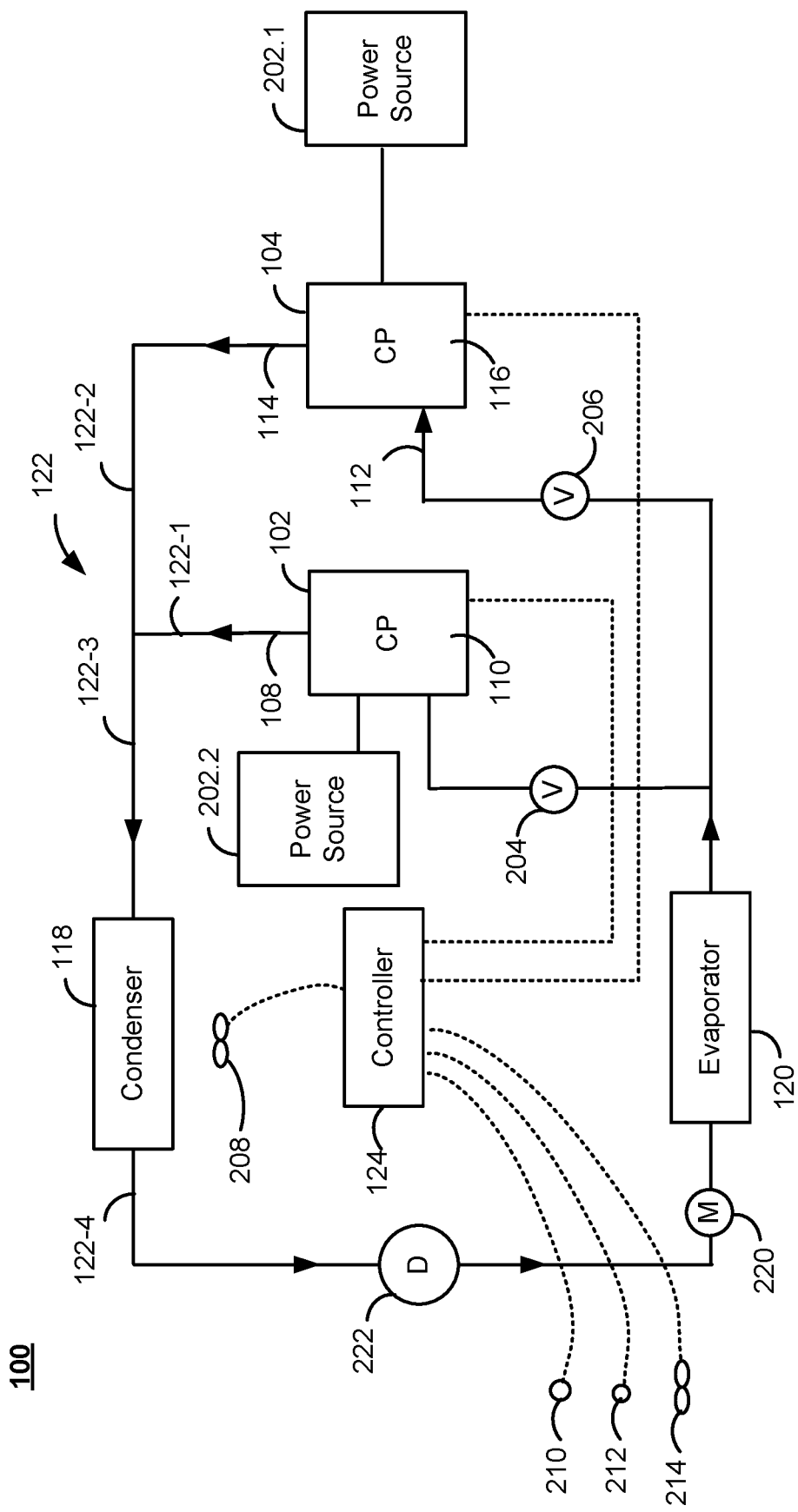
FIG. 2 is a block diagram illustrating the climate system of FIG. 1, including some additional and/or optional components.

Referring to FIG. 2, in some embodiments, the climate system (100) of the present disclosure further includes other additional or optional components. For instance, in some embodiments, the climate system (100) further includes a plurality of flow control valves such as a first flow control valve (204) and a second flow control valve (206). The first flow control valve (204) is disposed upstream of the first compressor (102) and configured to selectively restrict or permit flow of the refrigerant to the first compressor (102). The second flow control valve (206) is disposed upstream of the second compressor (104) and configured to selectively restrict or permit flow of the refrigerant to the second compressor (104).

In some embodiments, the climate system (100) further includes one or more air blowers. For instance, in the illustrated embodiment, the climate system (100) further includes a first air blower (208) positioned proximate the condenser (118). The first air blower (208) is configured to blow air over the condenser (118) to cool the condenser (118), and/or to vent interior air of the compartment to reduce the thermal load of the compartment. In some embodiments, the climate system (100) further includes a second air blower (214) electrically coupled to the controller (124). The second air blower (214) is configured and controlled by the controller (124) to vent the interior air of the compartment to outside, and/or to suck in the ambient or fresh air into the compartment. In some embodiments, the climate system (100) is integrated with an existing air conditioning system of the vehicle. In such cases, the first air blower (208) and/or the second air blower (214) are shared by the climate system (100) and the existing air conditioning system. In an embodiment, the first and second air blowers are mounted in the same compartment (e.g., sleep compartment or cab compartment). In another embodiment, the first and second air blowers are mounted in different compartments, for instance, the first air blower (208) in the sleeper compartment and the second air blower (214) in the cab compartment.

To automatically control the compressors, air blowers and/or other components in the system, in some embodiments, the climate system (100) of the present disclosure further includes a sensor (210) for measuring an atmosphere temperature and a thermostat (212) for setting a desired temperature and monitoring an interior temperature in the compartment. In such embodiments, the controller (124) is electrically coupled to the sensor (210) and the thermostat (212) and automatically control operations of other components (e.g., air blower, compressor) based on the atmosphere temperature, the interior temperature and the settings (e.g., desired temperature). For instance, when the interior temperature is higher than both of the atmosphere temperature and the desired temperature, the controller (124) turns on the first air blower (208) to vent interior air from the compartment before turning on the first or second compressor. In embodiments with a second air blower (214), the controller (124) additionally or optionally turns on the second air blower (214) to suck in the ambient or fresh air into the compartment. As such, the thermal load is reduced before turning on the compressors, and consequently the overall efficiency of the climate system is improved. When the interior temperature is lowered to the atmosphere temperature and the desired temperature is lower than the atmosphere temperature, the controller (124) turns on the first and/or second compressors to cool the compartment further down to the desired temperature. The controller (124) operates the first and/or second compressors (e.g., controlling the speed of a compressor) in accordance with the desired temperature and the atmosphere temperature.

In some embodiments, one or more compressors are driven by electrical power source or sources (202). In an embodiment, all of the compressors are driven by electrical power source or sources (202). In some embodiments, at least one compressor is driven by the internal combustion engine of the vehicle. By way of illustration, FIG. 2 shows the first compressor (102) is configured to be driven by the internal combustion engine, and the second compressor (104) is an electrically driven compressor. The second compressor (104) is configured to operate when the internal combustion engine of the vehicle is not running.

Continuously referring to FIG. 2, in some embodiments, the climate system (100) of the present disclosure further includes a metering device (220) disposed upstream of the evaporator (120). The metering device (220) is configured to control the flow of the refrigerant into the evaporator (120). Examples of the metering device (220) include a thermal expansion valve, a capillary tube, or the like. In some embodiments, the metering device (220) is electrically coupled to the controller (124) and its operation is automatically controlled by the controller (124).

In some embodiments, the climate system (100) further includes a receiver/drier (222) disposed at the refrigerant line (122-4) between the condenser (118) and the evaporator (120). The receiver/drier (222) is configured to temporarily store the refrigerant, absorb moisture from the refrigerant, or both.

Figure 3:
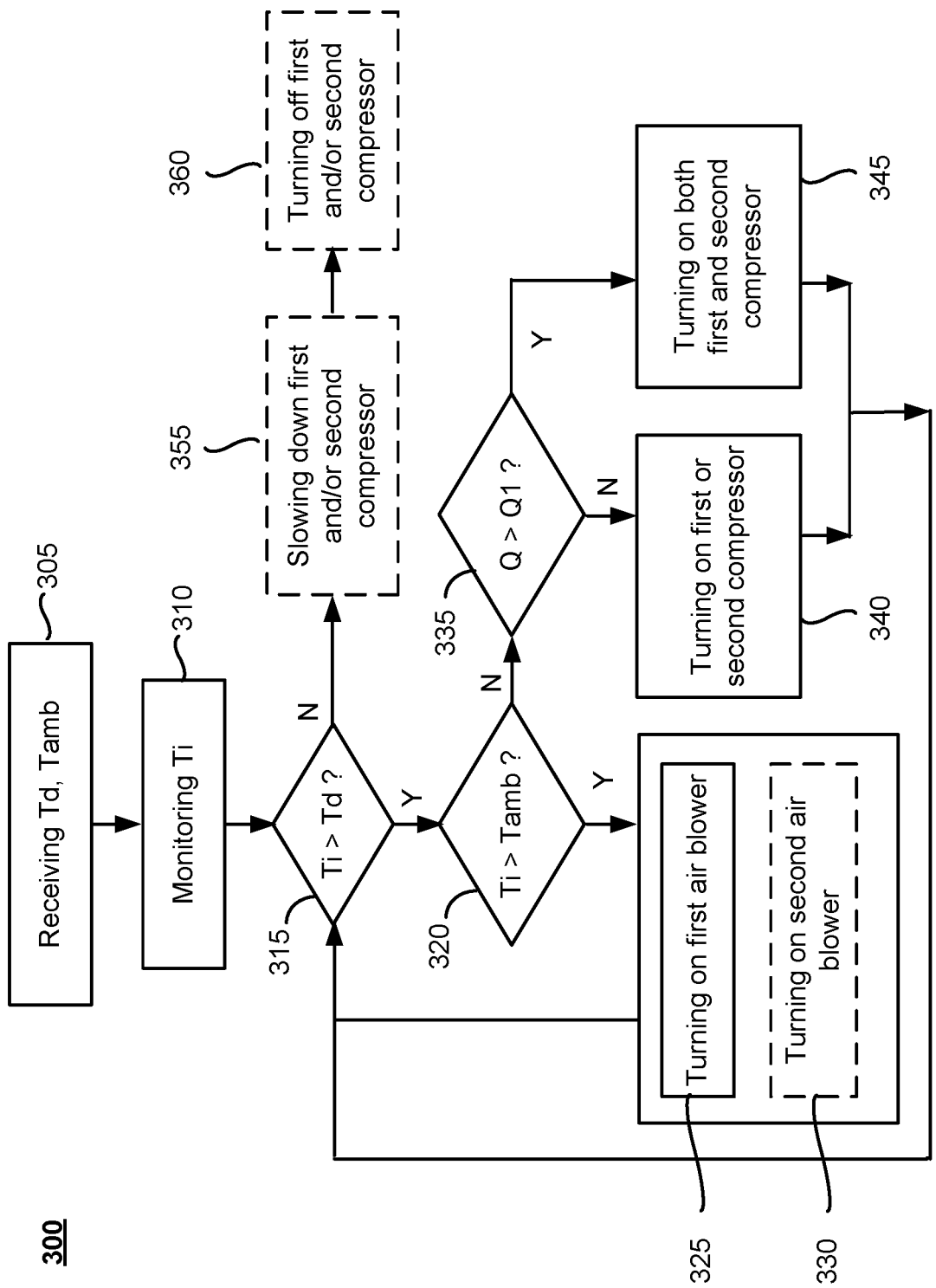
FIG. 3 is a flowchart illustrating a first exemplary method for controlling a climate system in accordance with some embodiments.
Figure 4:
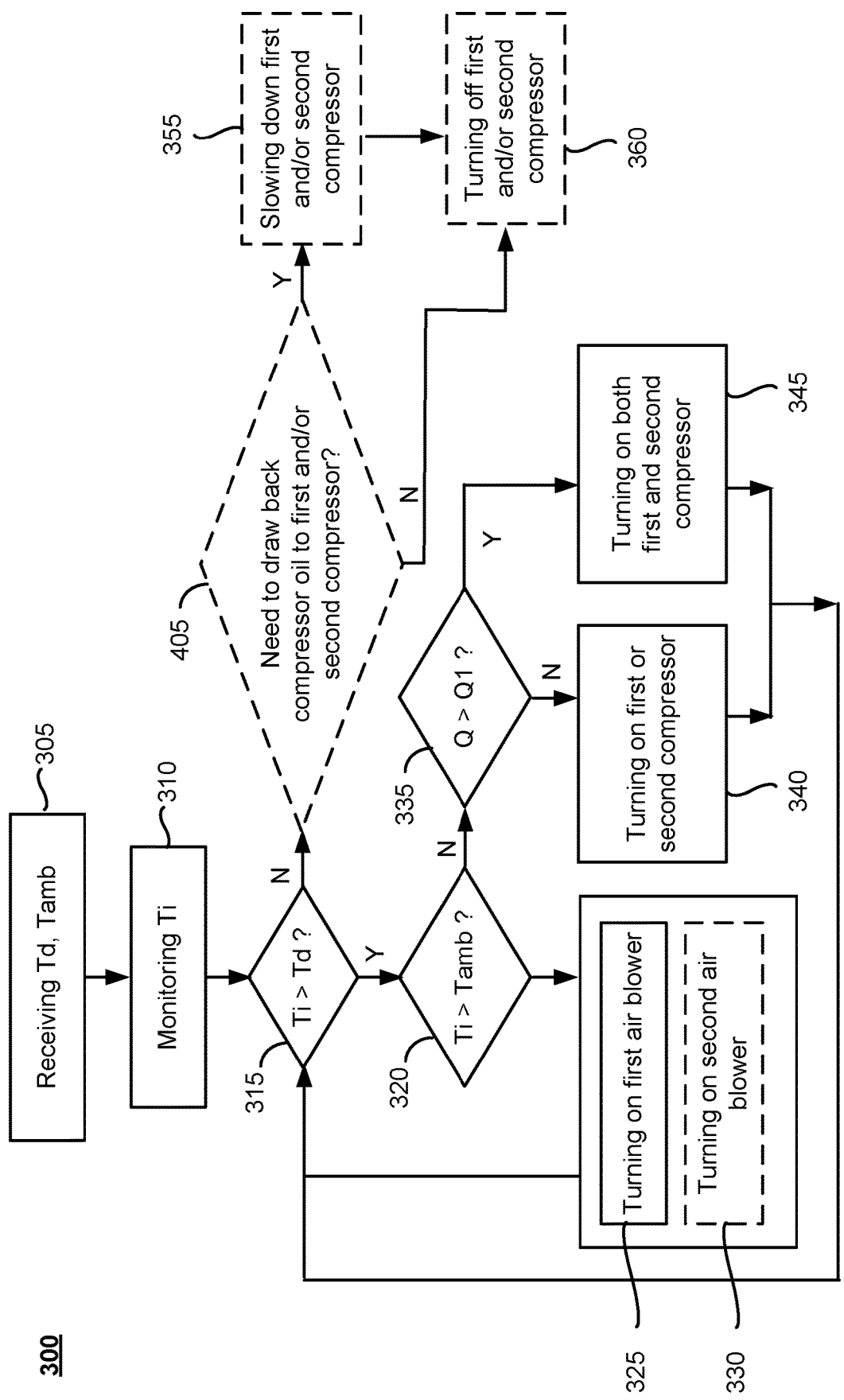
FIG. 4 is a flowchart illustrating the first exemplary method of FIG. 3, including some additional and/or optional steps.
Figure 5:
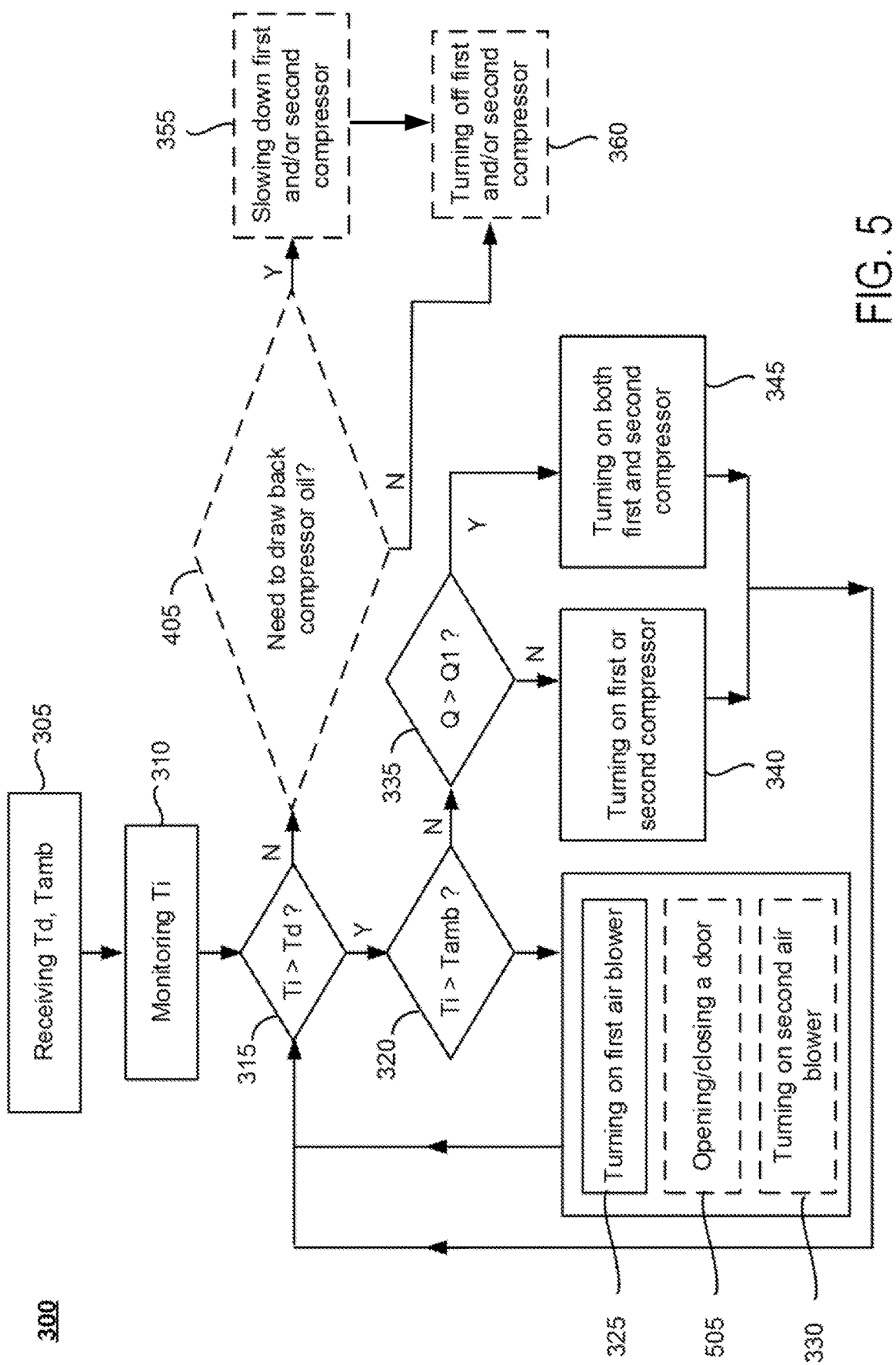
FIG. 5 is a flowchart illustrating the first exemplary method of FIG. 3, including some other additional and/or optional steps.

Turning now to FIGS. 3-5, there depict a first method (300) for controlling climate systems in accordance with some embodiments of the present disclosure. For illustration purpose, the first method (300) are described in the context of a climate system that includes a first compressor and a second compressor in parallel, i.e., the refrigerant inlets of the first and second compressors are fluidly connected to each other and refrigerant outlets of the first and second compressors are fluidly connected to each other. The climate system further includes a condenser disposed downstream of the first and second compressors and fluidly connected to the first and second compressors, and a first air blower positioned proximate the condenser and configured to blow air over the condenser. The climate system is installed in a vehicle for cooling a compartment of the vehicle.

In some embodiments, the first method (300) is governed by instructions that are stored in and executed by a controller such as the controller (124) illustrated in FIGS. 1 and 2. In some embodiments, the first method (300) is governed by instructions that are stored in and executed by an electronic device other than the controller (124) illustrated in FIGS. 1 and 2.

In some embodiments, the first method (300) includes: receiving a desired temperature for the compartment and an atmosphere temperature outside of the vehicle (step 305); monitoring an interior temperature in the compartment of the vehicle (step 310); determining whether the interior temperature is higher than the desired temperature (step 315); determining whether the interior temperature is higher than the atmosphere temperature (step 320); turning on the first air blower to vent interior air in the compartment, if the interior temperature exceeds both the desired temperature and the atmosphere temperature (step 325); determining whether the thermal load of the compartment exceeds a first thermal threshold, if the interior temperature is higher than the desired temperature but lower than or equal to the atmosphere temperature (step 335); turning on the first compressor or the second compressor if the thermal load of the compartment is less than or equal to a first thermal threshold (step 340); and turning on both the first compressor and the second compressor if the thermal load of the compartment exceeds the first thermal threshold (step 345).

In some embodiments, the climate system includes a second air blower, or the climate system is coupled to an existing air conditioning system and an air blower of the existing air conditioning system serves as a second air blower to the climate system. In such embodiments, the first method (300) includes an additional or optional step (step 330) that turns on the second air blower to suck in ambient or fresh air into the compartment of the vehicle, if the interior temperature exceeds both the desired temperature and the atmosphere temperature. The first and second air blowers may be operated simultaneously, alternately, or independently.

In some embodiments, the first method (300) automatically turns off the first compressor and/or the second compressor when the interior temperature is lowered to the desired temperature or when cooling is no longer desired (step 360). In some embodiments, before turning off the first compressor and/or second compressor, the first method (300) operates the first compressor at a first low speed range for a first low-speed time period before turning off the first compressor to allow compressor oil drawn back to the first oil sump and/or operates the second compressor at a second low speed range for a second low-speed time period before turning off the second compressor to allow the compressor oil drawn back to the second oil sump (step 355).

In some embodiments, operating the first compressor at the first low speed range for the first low-speed time period is performed every time when the first compressor is to be turned off or every other time when the first compressor is to be turned off. Similarly, in some embodiments, operating the second compressor at the second low speed range for the second low-speed time period is performed every time when the second compressor is to be turned off or every other time when the second compressor is to be turned off.

In some embodiments, the first method (300) further includes an additional or optional step 405, to determine whether it is needed to draw back compressor oil to one or more compressors. If it is determined that drawing back compressor oil is needed for a compressor, the first method (300) proceeds to step 355 to slow down that compressor (e.g., operating that compressor at a low speed range for a period of time) before turning it off at step 360. Otherwise, the first method (300) proceeds to step 360 to turn off that compressor. In some embodiments, the determination is based on how long the compressor has been running at a high speed range. For example, in some embodiments, operating the first compressor at the first low speed range for the first low-speed time period is performed after the first compressor is operated at a first high speed range for a first high-speed time period. Operating the second compressor at the second low speed range for the second low-speed time period is performed after the second compressor is operated at a second high speed range for a second high-speed time period.

In some embodiments, the second air blower is selectively in fluidic communication with the ambient, a fresh air system of the vehicle or the compartment of the vehicle through a duct such as a pipe, a conduit, a channel, a tube or the like. In some embodiments, a door is implemented to control the air flow. In such embodiments, the first method (300) includes an additional or optional step 505, which opens or closes the door before turning on the second air blower to allow the second air blower to blow the ambient or fresh air into the compartment of the vehicle.

Referring to FIG. 6, there depicts a second method (600) for controlling climate systems in accordance with some embodiments of the present disclosure. For illustration purpose, the second method (600) are described in the context of a climate system that includes a first compressor and a second compressor in parallel, i.e., the refrigerant inlets of the first and second compressors are fluidly connected to each other and refrigerant outlets of the first and second compressors are fluidly connected to each other. The climate system further includes a condenser disposed downstream of the first and second compressors and fluidly connected to the first and second compressors. The climate system is installed in a vehicle for cooling a compartment of the vehicle.

Like the first method (300), in some embodiments, the second method (600) is governed by instructions that are stored in and executed by a controller such as the controller (124) illustrated in FIGS. 1 and 2. In some embodiments, the second method (600) is governed by instructions that are stored in and executed by an electronic device other than the controller (124) illustrated in FIGS. 1 and 2.

In some embodiments, the second method (600) includes: receiving a desired temperature for the compartment and an atmosphere temperature outside of the vehicle (step 305); determining whether a thermal load of the compartment exceeds a first thermal threshold (step 335); turning on the first compressor or the second compressor if the thermal load of the compartment is less than or equal to a first thermal threshold (step 340); turning on both the first compressor and the second compressor if the thermal load of the compartment exceeds the first thermal threshold (step 345); and performing one or more of the following: operating the first compressor at a first low speed range for a first low-speed time period before turning off the first compressor to allow compressor oil drawn back to the first oil sump; and operating the second compressor at a second low speed range for a second low-speed time period before turning off the second compressor to allow the compressor oil drawn back to the second oil sump (step 355).

In some embodiments, prior to operating the first and/or second compressor at a low speed range (step 355), the second method (600) further include one or more of the following additional or optional steps: determining whether it is needed to draw back compressor oil to the first compressor based on whether the first compressor has been running at a first high speed range and for how long; and determining whether it is needed to draw back the compressor oil to the second compressor based on whether the second compressor has been running at a second high speed range and for how long (step 405). Based on the results of the determination, in some embodiments, the second method (600) further includes one or more of the following: operating the first compressor at a first low speed range for a first low-speed time period to draw back compressor oil to the first compressor if the first compressor has been operated at the first high speed range for a first high-speed time period; and operating the second compressor at a second low speed range for a second low-speed time period to draw back compressor to the second compressor if it is determined that the second compressor has been operated at the second high speed range for a second high-speed time period.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that, although the terms "first," "second," etc. may be used herein to describe various elements, these elements should not be limited by these terms. These terms are only used to distinguish one element from another. For example, a first compressor could be termed a second compressor, and, similarly, a second compressor could be termed a first compressor, without changing the meaning of the description, so long as all occurrences of the "first compressor" are renamed consistently and all occurrences of the "second compressor" are renamed consistently.

What is claimed is:

1. A climate system for conditioning air within a compartment of a vehicle, comprising:
    a first compressor that includes a first oil sump;
    a second compressor that includes a second oil sump, independent of the first oil sump;
    a first refrigerant-to-air heat exchanger fluidly coupled to the first and second compressors and thermally coupled to an exterior of the vehicle;
    a second refrigerant-to-air heat exchanger fluidly coupled to the first refrigerant-to-air heat exchanger and thermally coupled to the compartment of the vehicle;
    refrigerant lines fluidly connecting the first and second compressors and the first and second heat exchangers to form a refrigerant circuit; and
    a controller communicatively coupled to the first and second compressors and including instructions that are configured to selectively draw back compressor oil from the refrigerant lines to at least one of the first and second oil sumps by adjusting an operating speed of at least one of the first and second compressors.

2. The climate system of claim 1, wherein the controller is configured to:
    draw oil back to the first oil sump by lowering a speed of the first compressor for a first time period; and
    draw oil back to the second oil sump by lowering a speed of the second compressor for a second time period.

3. The climate system of claim 1, wherein the first oil sump and the second oil sump are not connected by an oil equalizing system.

4. The climate system of claim 1, wherein:
    the first compressor is configured to be driven by an internal combustion engine; and
    the second compressor is an electrically driven compressor.

5. The climate system of claim 1, further comprising:
    a first flow control valve disposed upstream of the first compressor and configured to selectively restrict or permit flow of the refrigerant to the first compressor; and
    a second flow control valve disposed upstream of the second compressor and configured to selectively restrict or permit flow of the refrigerant to the second compressor.

6. The climate system of claim 1, wherein the controller is further configured to:
    disable the first or the second compressor in accordance with a thermal load of the compartment meeting one or more criteria; and
    enable both the first and the second compressors in accordance with the thermal load of the compartment not meeting the one or more criteria.

7. The climate system of claim 1, further comprising a first air blower positioned proximate the second heat exchanger, and configured to do one or more of the following: (i) blow air over the second heat exchanger, and (ii) vent interior air of the compartment to reduce the thermal load of the compartment.

8. The climate system of claim 7, further comprising:
    a sensor configured to measure an atmosphere temperature; and
    a thermostat configured to enable a user to set a desired temperature and to monitor an interior temperature of the compartment;
    wherein the controller is electrically coupled to the sensor, the thermostat, and the first air blower; and
    wherein the controller is further configured to perform one or more of the following:
        in accordance with the interior temperature being higher than both of the atmosphere temperature and the desired temperature, turning on the first air blower to vent interior air from the compartment; and
        in accordance with the interior temperature being below the atmosphere temperature and the desired temperature being below the atmosphere temperature:
            operating at least one of the first compressor and the second compressor; and
            controlling operations of the first and second compressors in accordance with the desired temperature and the atmosphere temperature.

9. The climate system of claim 7, further comprising a second air blower installed in the vehicle and configured to pull fresh air into the compartment;
    wherein the controller is electrically coupled to the second air blower; and
    wherein the controller is further configured to perform one or more of the following: control the first air blower to vent the interior air of the compartment to outside; and control the second air blower to pull fresh air into the compartment.

10. The climate system of claim 9, wherein the climate system is integrated with an existing air conditioning system of the vehicle, and wherein the first air blower and the second air blower are shared by the climate system and the existing air conditioning system.

11. The climate system of claim 1, further comprising a metering device disposed upstream of the evaporator and configured to regulate flow of the refrigerant into the evaporator.

12. The climate system of claim 11, wherein the metering device is a thermal expansion valve or a capillary tube.

13. The climate system of claim 1, further comprising a receiver/drier disposed between the first heat exchanger and the second heat exchanger and configured to perform one or more of the following: (i) temporarily store the refrigerant, and (ii) absorb moisture from the refrigerant.

14. The climate system of claim 1, wherein the first compressor and the second compressor are coupled in parallel with one another.

15. The climate system of claim 1, wherein the controller is further configured to determine whether to draw back compressor oil to the first oil sump or the second oil sump.

16. The climate system of claim 15, wherein the controller is configured to determine whether to draw back compressor oil to the first oil sump or the second oil sump based on relative operating speeds of the first compressor and the second compressor over a prior time period.

17. The climate system of claim 15, wherein the controller is configured to:
   identify current speeds of the first and second compressors; and
   determine whether to draw back compressor oil to the first oil sump or the second oil sump based on an amount of time the first compressor and the second compressor have been operating at the current speeds.

18. A method of operating a vehicular climate control system, comprising: a controller communicatively coupled to a first compressor and a second compressor of the vehicular climate control system; operating the first compressor at a first speed; concurrent with operating the first compressor at the first, speed, operating the second compressor at a second speed; and drawing compressor oil back from refrigerant lines of the vehicular climate control system to a first oil sump corresponding to the first compressor by operating the first compressor at a third speed, lower than the first speed, for a first period of time; wherein the first oil sump is not fluidly connected to a second oil sump, the second oil sump corresponding to the second compressor.

19. The method of claim 18, wherein the second speed is less than the first speed.

20. The method of claim 18, wherein the third speed is less than the second speed.

* * * * *